June 5, 1951  F. J. BURNS  2,555,393
Venetian Blind
Filed July 11, 1949
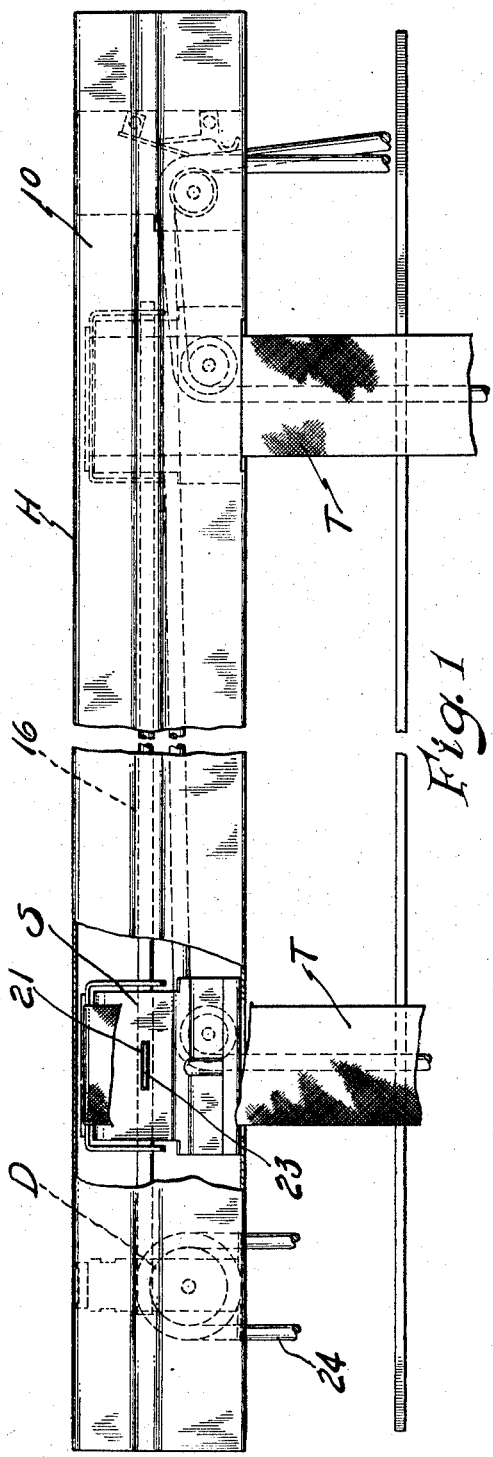
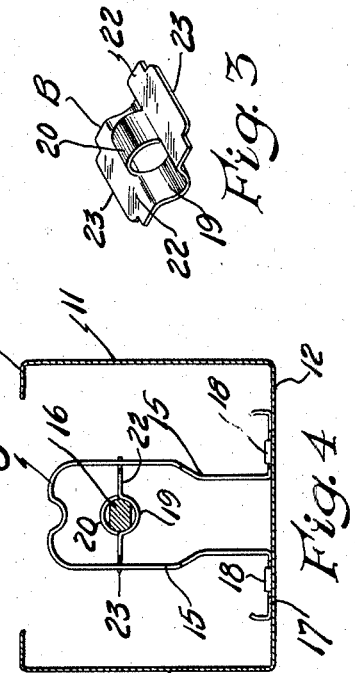
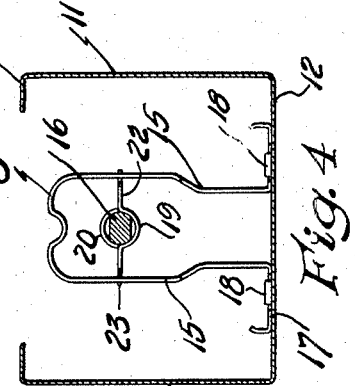
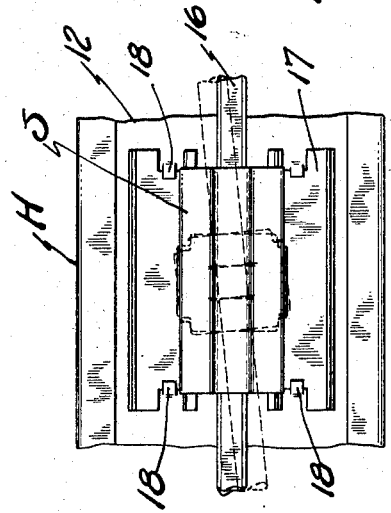
INVENTOR.
Fred J. Burns
BY
Frank C. Fearman
ATTORNEY Patented June 5, 1951

2,555,393

UNITED STATES PATENT OFFICE 2,555,393

VENETIAN BLIND

Fred J. Burns, Saginaw, Mich., assignor to The Columbia Mills, Inc., Syracuse, N. Y.

Application July 11, 1949, Serial No. 104,016

3 Claims. (Cl. 160—177)

This invention relates to Venetian blinds, and more particularly to floating bearing and tilt shaft support for supporting the tilt shaft and reinforcing the headbox and saddle bracket.

One of the salient objects of the invention is to design a very simple, practical and economical bearing in which the tilt shaft is journaled and which permits angular displacement of said shaft and/or misalignment of the blind-actuating hardware, without binding or in any manner interfering with the normal operation of the tilting mechanism.

Another object is to design a very simple bearing which can be formed of stampings, and which can be mounted in position without the use of bolts, welding or other securing means.

A further object still is to provide a bearing which can be assembled in the saddle bracket with a minimum of labor, and which eliminates the individual conventional bearing supports which span the headbox and must be secured in position, thus effecting a substantial saving in time, labor and material.

Still a further object is to design a compact bearing which floats in the bracket and which compensates for any sag or misalignment of the tilt shaft, headbox or other parts.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit or sacrificing any of the advantages of the invention.

In the drawing:

Fig. 1 is a fragmentary, front-elevational view of a Venetian blind showing the bearing in position, parts being broken away to more clearly show the construction.

Fig. 2 is an enlarged, fragmentary, top, plan view, the broken lines illustrating the movement of the tilt shaft in the bearing.

Fig. 3 is a perspective view of the bearing.

Fig. 4 is a transverse-sectional view through the headbox showing the bearing journaled in the saddle bracket stamping.

Referring now to the drawing in which I have shown the preferred embodiment of my invention, and in which the headbox of the blind is indicated by the letter H. This headbox is preferably channel-shaped in cross-section and comprises front, back and bottom walls 10, 11 and 12 respectively.

Transversely spaced tape openings 14 are provided on the bottom wall 12 and accommodate the respective ends of the ladder tape L as usual, these tapes normally bearing on the side walls 15 of the saddle member S, and the ends of the tapes T are connected to a tilt bracket (not shown), which bracket forms a part of my application for Letters Patent of the United States, on Venetian Blinds, filed August 28, 1948, Serial No. 46,589, upon which Patent 2,530,422 was issued November 21, 1950.

The saddle members S are formed as clearly shown in Figs. 1, 2 and 4 of the drawing, and are mounted in the headbox between the tape openings 14 in horizontal alignment with the tilt shaft 16, the lower ends of the bracket side walls being turned as at 17, and tabs 18 are punched in the bottom wall 12 for engagement with the turned foot sections 17 to hold them securely in position.

The bearings B are mounted to float in the side walls 15 of the saddle members S and are formed as clearly shown in Fig. 3 of the drawing, each bearing being preferably stamped and is formed with a centrally disposed semi-circular shaft accommodating seat 19, one section 20 of the seat being pressed in a direction opposite to the main seat, said intermediate portion 20 serving as a cap for said bearing. Slits 21 are provided in the side walls 12 of the saddle members S and are of suitable length to freely accommodate the shouldered wing sections 22 of the bearing, said shoulders spacing and reinforcing the bracket legs with relation to each other.

The bearing B is assembled in the saddle members S as a unit prior to mounting in the headbox; it is merely necessary to spring the bracket legs sufficiently to permit the shouldered wing sections 23 of the bearing to be inserted in the slitted openings 21, and the tilt shaft 16 is then inserted endwise in the bearings and the tilt assembly D; the shaft requires no further support and operation of the tilt cord 24 will tilt the blind as desired.

From the foregoing description, it will be obvious that I have perfected a very simple, practically and relatively inexpensive stamped bearing and mounting for the tilt shafts of Venetian blinds.

What I claim is:

1. The combination with the saddle brackets of a Venetian blind, of a one-piece tilt shaft bearing supported in said bracket and mounted for limited angular movement therein, said bearing being formed with opposed, semi-cylindrical sections forming a cap and bearing respectively for the tilt shaft of a Venetian blind.

2. The combination with the saddle bracket of a Venetian blind, of a one-piece tilt shaft bearing floatingly mounted on the saddle bracket, and comprising spaced-apart bearing sections and a cap section formed integral with and interposed between said bearing sections.

3. The combination with the saddle bracket of a Venetian blind, of a one-piece stamped bearing member formed with horizontally aligned bearing sections, a cap section interposed between said bearing sections, and laterally projecting wings on said bearing for releasable floating engagement with the saddle bracket.

FRED J. BURNS.

REFERENCES CITED

The following references are of record in the file of this patent:

UNITED STATES PATENTS

| Number | Name | Date |
|---|---|---|
| 2,247,321 | Stuber | June 24, 1941 |